May 13, 1969  F. KENNEDY  3,443,523
SHOCK ABSORBING DEVICE TRANSFERRING IMPACT FORCES
DIRECTLY TO THE TRACK BED
Filed Jan. 31, 1967  Sheet 1 of 2
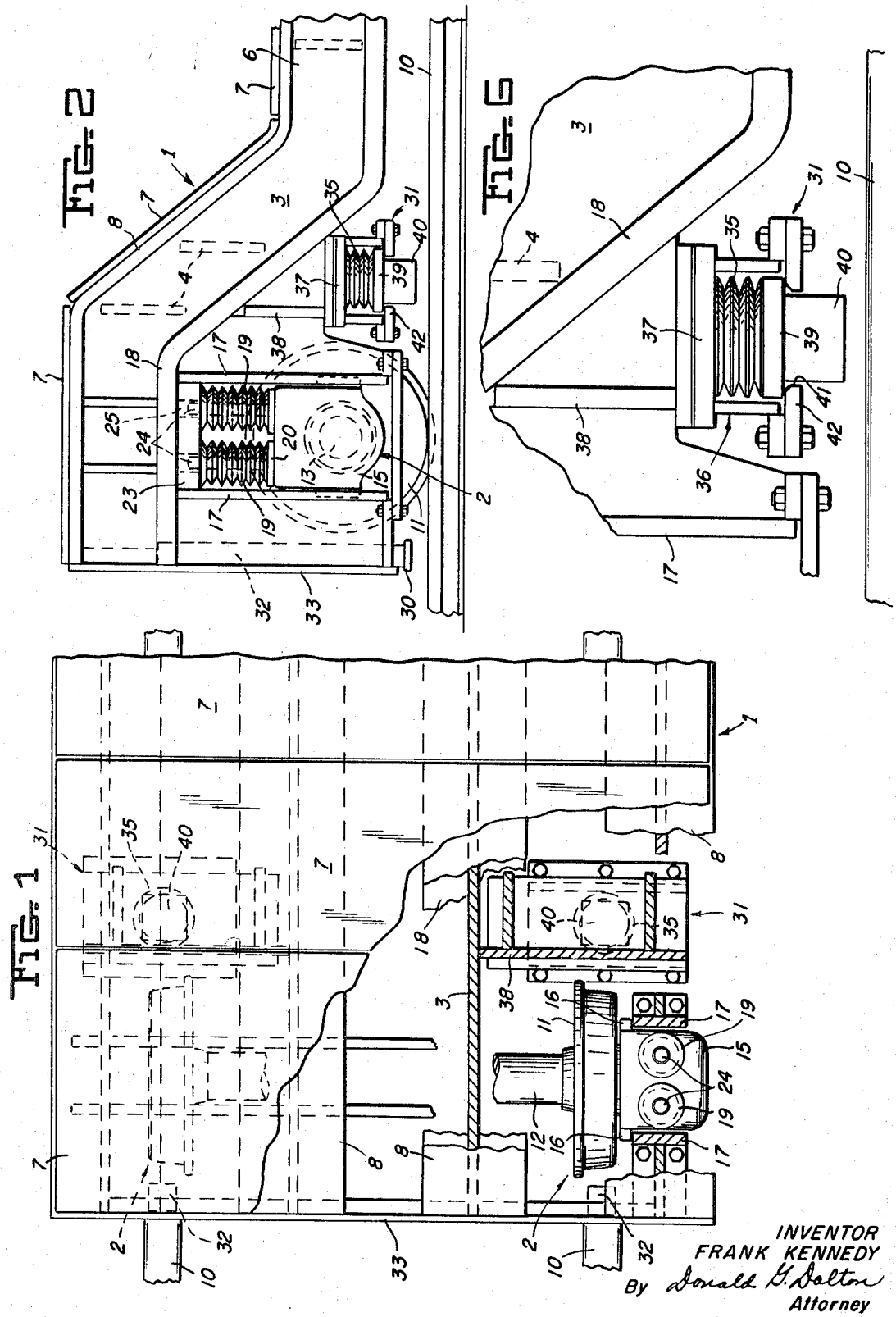
INVENTOR
FRANK KENNEDY
By Donald G. Dalton
Attorney

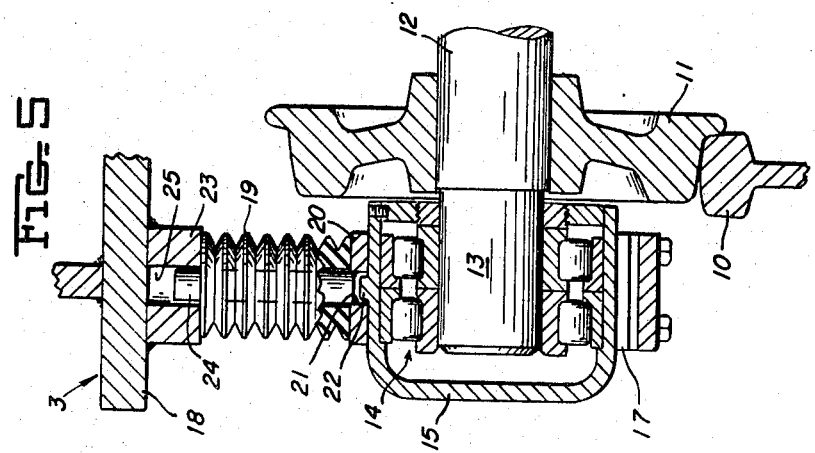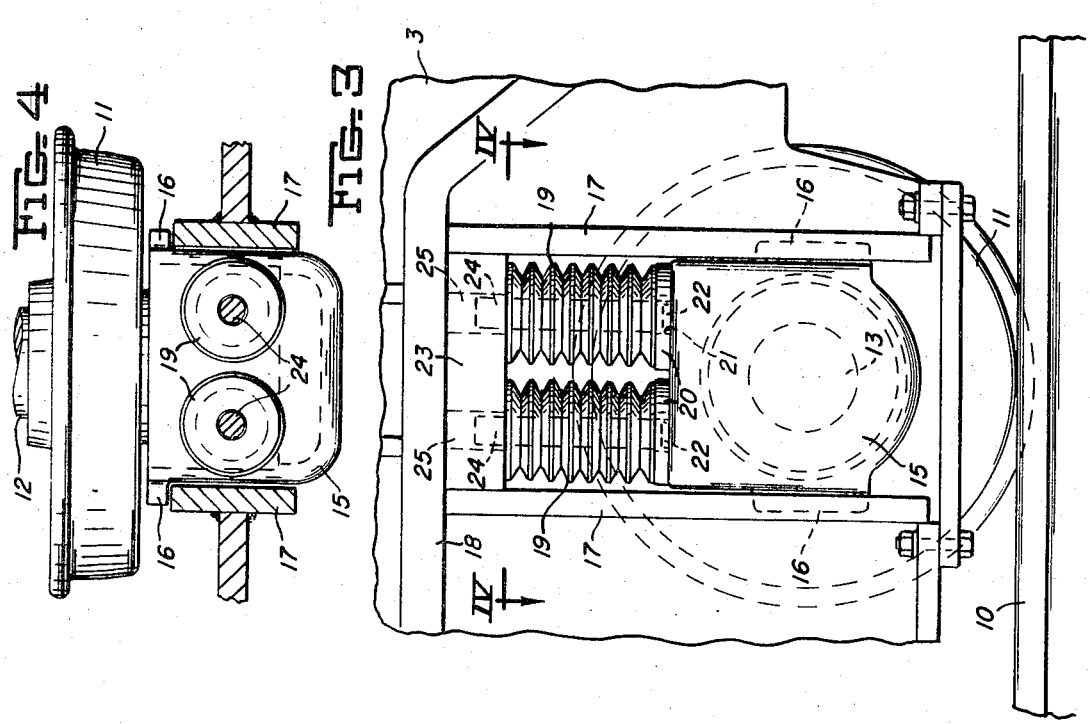

United States Patent Office 3,443,523
Patented May 13, 1969

---

3,443,523
SHOCK ABSORBING DEVICE TRANSFERRING IMPACT FORCES DIRECTLY TO THE TRACK BED
Frank Kennedy, Johnstown Pa., assignor to United States Steel Corporation, a corporation of Delaware
Filed Jan. 31, 1967, Ser. No. 612,944
Int. Cl. B61f 1/08, 5/02, 13/00
U.S. Cl. 104—1                                                 9 Claims

ABSTRACT OF THE DISCLOSURE

A railway car subject to impact loading having a stop mounted on the chassis for engaging a railway rail or other support to limit downward springing movement of the car as the result of impact loading, and a shock absorber which engages the rail prior to its engagement by said stop and operates to cushion downward movement of the car. The shock absorber is preferably a compressible rubber pad and in conjunction with the said stop enables the use of rubber pads in place of coil springs for supporting the car on the usual wheel and axle assemblies.

---

This invention relates to railway cars and, more particularly, to apparatus for diverting excess force generated by impact loading of a car directly to the railway bed and over a path which does not include the car's axle journal bearings. In a manner to be described such apparatus protects the car journal bearings against damage and effects a more uniform distribution of impact forces to enable the construction of such cars with fewer wheels and a spring construction that is less complex and expensive compared to previous constructions.

When railway cars are loaded with material falling from an overhead chute or weighing device, the impact of the material striking the car body generates forces that are much larger than those produced by maximum car loads under stationary or running conditions. Heretofore impact forces of this character have been transmitted from the car bodies to the trackway rails through the wheel and axle assemblies supporting the car thereon, and in order to withstand such forces previous car designs required a massive construction with a multiplicity of trucks, axles, and wheels to distribute the forces transmitted through the car to the rails. Such previous car designs also utilized high capacity coil springs to absorb as much kinetic energy as possible, with consequent rebound of the springs subsequent to impact, resulting in possible displacement of the car wheels from the track in conjunction with considerable vibration of the car body structure. Railway cars employed for transporting scrap to a furnace in steel mill operations, particularly those equipped with a self-dumping box for receiving the charge of steel scrap from a scale or weighing device, are especially subject to impact forces and disadvantages of the character just indicated.

The apparatus of this invention operates to control and limit the downward spring movement of a railway car body under impact forces greater than those which are encountered under normal running conditions with a maximum load on the car body and which are usually ineffective to move the body downwardly relative to the car wheels below a predetermined level. According to one aspect of the invention, downward movement of the car body by shock forces beyond said predetermined level is initially restrained and controlled by a shock absorber at each wheel which is positioned between the car body and the car rails. Such shock absorbers are resiliently compressed and resist the further downward movement of the car body and in being compressed transfer the portion of the excess force causing such movement directly to the car rail. According to another aspect of the invention, the extent of the downward movement of the car body under impact force is limited by a stop adjacent each wheel. Such stops are secured to the car body and engage the car rails after full compression of the shock absorbers and operate to limit the downward movement of the car body. The stops thus operate to transfer the remaining portion of the excess force above that required for compression of the shock absorbers directly to the car rails. In this manner the total force of the load on the car is distributed to the rails or railway bed at several points, which include the points at which the rails are engaged by the shock absorbers and stops, rather than just through the car wheels and their journal bearings which are thus not subject to damage from forces of this character.

Other advantages and objects of the invention will become apparent from the following description and the accompanying drawings, in which:

FIGURE 1 is a fragmentary plan view of one end of a railway car that is equipped with apparatus constructed in accordance with the principles of this invention and in which a portion of the car bed has been broken away to show the underlying structure of the wheel and axle assembly by which loads thereon are transferred to a railway rail;

FIGURE 2 is a side elevation of the car structure shown in FIGURE 1;

FIGURE 3 is an enlarged view of a fragmentary portion of the apparatus shown in FIGURE 1 which illustrates in greater detail the manner in which the car body is mounted on a wheel and axle assembly;

FIGURE 4 is a view taken along the line IV—IV in FIGURE 3;

FIGURE 5 is a vertical sectional view taken along a diameter of the assembly shown in FIGURE 3; and FIGURE 6 is an enlarged view of a portion of the structure shown in FIGURE 2 which shows in greater detail one of the impact force shock absorbers that are mounted adjacent each wheel and axle assembly.

The drawings show the apparatus of this invention on a railway car 1 for transporting steel scrap to an open hearth or to any oxygen steelmaking converter in a steel mill. While the wheel and axle assemblies 2 are shown at one end only of the car 1, it will be understood that the other end of the car is provided with wheel and axle assemblies of similar construction. The car chassis comprises a plurality of longitudinally extending wide flanged beams 3 that are held in spaced relation by transversely extending reinforcing plates or ribs 4 and are shaped in the form of a cradle to provide a horizontally extending center portion 6 for supporting thereon a side dump charging box (not shown), which may be loaded with a charge of steel scrap from an overhead scale or weighing device. The reinforcing ribs 4 extend transversely with respect to the webs of the beams 3 to which they are connected by welding. The floor of the car is formed by steel plates 7 which are welded to the upper flanges 8 of the beam 3 along the length thereof.

Each corner of the car 1 has a wheel and axle assembly 2 to support the car for rolling movement over railway rails 10. As best shown in FIGURES 3–5, each of the assemblies 2 comprises a flanged wheel 11 keyed on an axle 12 which has journals 13 at its opposite ends which are arranged outwardly with respect to the wheels 11. Each journal 13 is rotatably supported by a journal bearing assembly 14 in a journal housing 15 which has guide lugs 16 on opposite sides thereof. The lugs 16 have sliding engagement in vertically extending guides 17 to guide the vertical movement of the journal housing 15 with respect to the car body 1. The guides 17 have welded connections at their upper ends with the lower flanges 18 of the beams 3 and form part of a housing for a pair of compressible cushioning pads 19, which furnish a resilient or spring-like support for the car body on the upper ends of the journal housings 15. The lower ends of the pads 19 are supported on circular plates 20 carried by the housings 15. Each of the plates 20 has a central opening 21 in which a nipple 22 extending upwardly from the housing 15 is received to hold the plates 20 against movement with respect to the housing 15. The upper ends of the pads 19 bear against force transmitting blocks 23 welded to the undersides of the beam flanges 18 between the side guides 17. Steel guide pins 24 are received in openings 25 formed in the guide blocks 23 and in the pads 19. The pins 24 operate to hold the upper ends of the pads 19 against lateral movement with respect to the bearing blocks 23 during compressive cushioning action of the pads 19. The cushioning pads 19 are fabricated from neoprene or other similar springy and rubber-like material which is suitable as a spring support for a car body.

Although cushioning springs, such as the pads 19, have been used previously for supporting car bodies on wheel and axle assemblies, their use in this manner for steel scrap cars, or for other cars subject to impact loading forces, has been generally regarded as unsuitable because of the impact force generated during loading, the use of heavy coil springs of high load-carrying capacity having been previously regarded as essential to absorb the forces which are generated in this manner.

In accordance with the principles of this invention, each of the wheel and axle assemblies 2 is provided with a stop 30 and a shock absorber 31 for diverting impact loading forces, which are in excess of those encountered during running conditions of the car with a maximum load on the center portions 6 thereof, to the rails 10 over a path which does not include the journal housings 15 or the bearings 14 therein. In a manner to be described the stops 30 and shock absorbers 31 operate to transfer the excess impact loading forces directly to the railway rails or other railway bed support.

The stops 30 comprise steel plates secured to the lower ends of vertically extending bars 32 which also furnish a support for an end plate or bumper 33 which is welded thereto. The bars 32, end plate 33 and stops 30 from a rigid and inflexible beam-like structure which extends downwardly from the car body 1 and is movable therewith relative to the wheel and axle assemblies 2. When the stops 30 engage the upper surface of the rails 10, further downward movement of the car body 1 is stopped, and all of the additional force applied to the car is transmitted directly to the rails 10 by the sops 30.

The shock absorber 31, as best shown in FIGURE 6, comprises a compressible cushioning pad 35 formed of neoprene or similar rubber-like material, which is similar to the spring pads 19 and is mounted in a housing 36 that includes an upper plate 37 that is supported by a bracket 38 secured to the beams 3 of the car 1 for vertical movement therewith. A force transmitting member 39 is mounted for vertical movement in the housing 36 and has a steel bumper element 40 connected thereto which projects downwardly through an opening 41 in the lower plate 42 of the housing 36. In a manner to be described, the bumper element 40 is adapted to engage the rail 10 during the initial portion of the downward movement of the car under impact loading forces and to compress the cushioning pad 35 and by so doing to transmit a portion of such force directly through the shock absorber 31 to the rail 10. In order that the shock absorber 31 may operate in this manner, the lower end of its bumper element 40 is located at a vertical level below that of the stop 30, so that it will engage the rail 10 and compress the shock absorber 31 fully before the stop 30 engages the rail 10. The shock absorber 31 is a conventional unit which may be obtained from the National Castings Co. of Cleveland, Ohio and which has been used previously as a bumper element on the sides and ends of railway cars for limiting movement thereof over trackwap rails.

Although the stops 30 and shock absorber bumper elements are shown as engaging the rails 10, it will be understood that these elements, if desired, may be located to engage other parts in the form of stationary supports which are spaced laterally with respect to the rails 10 and form part of the railway bed.

FIGURES 2 and 6 show the relative positions of the stop 30 and shock absorber 31 with respect to the rail 10 when the car 1 is stationary and carrying a full load on its horizontal portion 6. Under this condition, the spring pads 19 are partially compressed and transmit the downward force exerted by the car body 1 and the load thereon directly through the wheel and axle assemblies 2 to the rails 10. The springing action provided by the pads 19 during normal rolling movement of the car over the rails 10 is such that the extreme downward springing movement of the car body 1 does not travel beyond a predetermined position in which the lower ends of the bumper elements are spaced vertically above the rails 10.

As indicated above, impact forces generated by loads gravitating onto the car 1 may be sufficient to drive the car body 1 downwardly relative to the wheel and axle assemblies 2 to an extent greater than usually takes place during normal rolling movement of the car over the rails 1. When this occurs, the bumper elements 40 engage the rails 10 and transmit thereto the portion of the impact force above that required to effect an additional compression of the spring pads 19. This action continues until the shock absorbers 31 are fully compressed and at this point the stops 30 engage the rails 10 to limit further downward movement of the carb ody. It will accordingly be apparent that all of the downward force in excess of that required to engage the stops 30 with the rails 10 is transmitted directly to the rails 10 rather than through the wheel and axle assemblies.

Attention is particularly directed to the fact that the provision of the stops 30 and shock absorbers 31 increases the number of points at which impact forces are transmitted to the railway bed. In this manner it will be apparent that the shock loads applied to the wheel journal bearings 14 are limited which are accordingly protected against damage and thus enable the construction of railway cars 1 with a smaller number of wheel and axle assemblies 2 than previously considered necessary. Attention is further directed to the fact that the provision of the impact force limiting stops 30 and shock absorbers 31 enable the use of rubber bumper pads 19 as a spring support for the car 1 instead of the heavy coil springs previously considered essential to absorb the shock loads encountered in railway cars for hauling steel scrap.

While one embodiment of my invention has been shown and described, it will be apparent that adaptations and modifications may be made without departing from the apended claims.

I claim:

1. In apparatus for handling impact forces developed by loads dropped on a railway car, the combination with a car body, a railway bed, railway wheel and axle assemblies for supporting said body on said bed, and spring means vertically aligned with said assemblies and mounting said body thereon, said spring means under maximum static and running loads supporting said body above a selected level relative to said railway bed, means limiting the downward springing movement of said body by forces in excess of those developed by said static and running loads comprising force transmitting members respectively secured to said car body adjacent each and independently of said wheel and axle assemblies, said members normally occupying positions out of engagement with said railway bed and above said selected level, said members being movable downwardly with said body into engagement with said railway bed to transfer impact loading forces directly thereto in response to downward movement of said body below said level by the impact of loads being dropped on said body.

2. A railway car impact force handling apparatus as defined in claim 1 characterized by said railway bed comprising a railway rail on which the wheels of said wheel and axle assemblies have rolling engagement.

3. A railway car impact force handling apparatus as defined in claim 1 characterized by each of said force transmitting members comprising a rigid structure secured to and depending vertically from said body with its lower end spaced above said railway bed when said body is above said level.

4. A railway car impact force handling apparatus as defined in claim 1 characterized by each of said force transmitting members comprising a resiliently compressible shock absorbing means including a part at its lower end for engaging said railway bed to effect its compression and absorb at least a portion of said excess forces during downward movement of said body below said level.

5. An apparatus as defined in claim 4 characterized by said force handling means further comprising stops secured to and depending from said body adjacent each of said wheel assemblies for engaging said railway bed to limit downward movement of said car body relative thereto.

6. An apparatus as defined in claim 5 characterized by said stops and the said lower ends of said force transmitting members being spaced at different vertical levels relative to said railway bed, said lower ends being at a level between said stops and said railway bed so that they have initial engagement with said railway bed to render them effective to transfer a portion of said excess forces to said railway bed, subsequent engagement of said stops with said railway bed operating to transfer the remainder of said excess forces thereto.

7. In a railway car subject to impact forces generated by dropping loads thereon, a car body, a railway bed, railway wheel and axle assemblies for supporting said body on said bed, and resilient cushioning pads vertically aligned with said assemblies and mounting said body thereon, said cushioning pads under maximum static and running loads supporting said body above a selected level relative to said railway bed, and means operative upon movement of said car body below said level for transferring impact forces in excess of those developed by said maximum loads directly from said car body to said railway bed to thereby limit the force transmitted through said pads to said wheel and axle assemblies.

8. A railway car as defined in claim 7 characterized by said force transfer means comprising a shock absorber in the form of a flexible cushioning pad and an operating part engageable with said railway bed to compress said cushioning pad upon movement of said car body below said level.

9. A railway car as defined in claim 8 characterized by the provision of a stop carried by said body for engagement with said railway bed after compression of said shock absorber cushioning pad to limit further downward movement of said car body below said level and to transfer to said railway bed the remainder of said excess force above that required to compress said cushioning pad.

References Cited

UNITED STATES PATENTS

| | | | |
|---|---|---|---|
| 183,441 | 10/1876 | Wilson | 105—216 X |
| 481,068 | 8/1892 | Simmons | 105—216 |
| 1,810,718 | 6/1931 | Lord | 105—199 |
| 2,259,049 | 10/1941 | Swan et al. | 308—138 |
| 2,915,990 | 12/1959 | Hammond | 105—73 X |
| 3,311,067 | 3/1967 | Gretzschel et al. | 105—216 X |

ARTHUR L. LA POINT, Primary Examiner.

HOWARD BELTRAN, Assistant Examiner.

U.S. Cl. X.R.

104—242; 105—157, 165, 199, 216, 217; 308—138